United States Patent [19]

Iizuka

[11] Patent Number: 5,617,403
[45] Date of Patent: Apr. 1, 1997

[54] OPTICAL PICKUP

[75] Inventor: Genichi Iizuka, Chiba, Japan

[73] Assignee: Sony Corporation, Tokyo, Japan

[21] Appl. No.: 489,393

[22] Filed: Jun. 12, 1995

[30] Foreign Application Priority Data

Jun. 21, 1994 [JP] Japan .................................. 6-163173

[51] Int. Cl.$^6$ .............................. G11B 7/08; G11B 21/16
[52] U.S. Cl. .................... 369/244; 369/44.14; 359/814
[58] Field of Search ..................... 369/219, 220,
369/223, 44.14, 44.15, 44.16, 44.21, 44.22,
251, 253, 244, 246, 247, 248, 249; 359/814,
823, 824

[56] References Cited

U.S. PATENT DOCUMENTS

| | | | |
|---|---|---|---|
| 4,912,693 | 3/1990 | Goda | 369/44.14 |
| 5,008,873 | 4/1991 | Tanaka et al. | 369/44.14 |
| 5,124,974 | 6/1992 | Kato et al. | 360/109 |
| 5,132,534 | 7/1992 | Namigawara | 369/44.15 |
| 5,345,432 | 9/1994 | Kasahara et al. | 369/44.14 |

FOREIGN PATENT DOCUMENTS

| | | |
|---|---|---|
| 0186218 | 7/1986 | European Pat. Off. . |
| 0238224 | 9/1987 | European Pat. Off. . |
| 58-26329 | 2/1983 | Japan ........................ 369/44.14 |
| 61-239429 | 10/1986 | Japan ........................ 369/44.14 |
| 62-170028 | 7/1987 | Japan . |
| 63-42036 | 2/1988 | Japan ........................ 369/44.14 |
| 3-95729 | 4/1991 | Japan ........................ 369/44.16 |
| 5303749 | 11/1993 | Japan ........................ 369/244 |

Primary Examiner—Stuart S. Levy
Assistant Examiner—David L. Ometz
Attorney, Agent, or Firm—Jay H. Maioli

[57] ABSTRACT

An optical pickup comprises a slide member displaced between an inner periphery of an information recording medium and an outer periphery thereof, a laser-beam receiving and emitting device comprised of an emitting unit for irradiating the information recording medium with a laser beam and a receiving unit for receiving therein a laser beam reflected from the information recording medium, a first laser-beam receiving and emitting device holding means rotated so as to approximately linearly move with a position different from an optical axis of the laser beam as a fulcrum to thereby position and hold the laser-beam receiving and emitting device, and a second laser-beam receiving and emitting device holding means rotated with the optical axis thereof as a fulcrum to thereby position and hold the laser-beam receiving and emitting device. According to the above construction, the use of two types of slide members become unnecessary and the position of the slide member can be easily adjusted.

11 Claims, 9 Drawing Sheets

OPTICAL PICKUP

BACKGROUND OF THE INVENTION

1. Field of the Invention

The present invention relates to an optical pickup suitable for use in an optical disc device for an optical disc such as a compact disc, a magneto-optical disc (such as an MD) or the like.

2. Description of Related Art

A conventional optical pickup employed in an optical disc device is provided with a laser diode, a beam splitter, photodiodes, etc. However, a laser coupler has been applied to the optical pickup as an alternative to the laser diode, the beam splitter, the photodiodes, etc. owing to a demand for a size reduction in the optical pickup and the like.

The laser coupler has an emitting unit for emitting a laser beam to irradiate an optical disc therewith and a receiving unit for receiving therein a laser beam reflected from the optical disc.

This type of laser coupler is a so-called laser-beam emitting device/laser-beam receiving device (hereinafter called a laser-beam receiving and emitting device). The laser-beam emitting and receiving device is incorporated into an IC.

In the conventional laser coupler referred to above, a tracking error signal of the optical disc is obtained by, for example, a so-called push-pull system using one spot. Alternatively, the tracking error signal is obtained by a three-spot system using three spots.

By using the IC incorporating the laser-beam emitting and receiving device therein, the optical pickup can be constructed by a combination of a biaxial device and the IC alone.

The biaxial device is also called a biaxial actuator. In the biaxial device, an objective lens is displaced in focus and tracking directions by a magnetic driving force so as to focus a laser beam emitted from the laser-beam emitting device of the laser coupler onto a signal surface of the optical disc, whereby the laser beam can be accurately applied to a recording track therealong.

The IC having the biaxial device and the laser-beam emitting and receiving device both incorporated therein is provided for a slide base of the optical pickup.

The slide base is used to displace the optical pickup in the radial direction of the optical disc between the inner periphery of the optical disc and the outer periphery thereof.

However, this type of optical pickup needed to prepare the following two adjustments in order to perform the positioning of the laser coupler with respect to the slide base.

Namely, two kinds of laser couplers are needed: one displaced parallel to the slide base to adjust its position according to a tracking mode to be adopted; and the other one rotated relative to the slide base to adjust its position according to the tracking mode to be adopted. It is necessary to move the laser coupler parallel to the slide base to adjust its position or rotatably displace the laser coupler to adjust its position, according to the way of obtaining or adopting tracking.

As the way of adopting the tracking, the push-pull system and the three-spot system are known.

When it is desired to obtain a tracking error signal by the push-pull system, the laser coupler is displaced parallel to the slide base and must be positionally adjusted such that a spot of a laser beam is brought to a proper position of the laser-beam receiving device of the laser coupler.

On the other hand, when it is desired to obtain the tracking error signal by the three-spot system, the laser coupler is rotated and moved relative to the slide base and must be positionally adjusted so that the spot of the laser beam is brought to the proper position of the laser-beam receiving device of the laser coupler.

Thus, since the two types of systems for displacing the laser coupler and adjusting its position are adopted according to the tracking method, it is necessary to prepare two types of different slide bases and two types of different bases for the laser coupler and make varying combinations of the slide bases and the bases for the laser coupler, thus leading to higher manufacturing costs. Further, the parallel-moving type positional adjustment and the rotational-moving type positional adjustment need adjusting jigs much different from each other and adjusting methods of the adjusting jigs are also much different from each other.

SUMMARY OF THE INVENTION

With the foregoing problems in view, it is therefore an object of the present invention to provide an optical pickup which makes it unnecessary to provide two types of slide bases and is capable of easily performing its positional adjustments.

According to one aspect of the present invention, for attaining the above object, there is provided an optical pickup used for reproducing information recorded on an information recording medium with a laser beam and recoding information on the information recording medium with the laser beam, comprising a slide member displaced between an inner periphery of the information recording medium and an outer periphery thereof, a laser-beam receiving and emitting device comprised of an emitting unit for irradiating the information recording medium with the laser beam and a receiving unit for receiving therein a laser beam reflected from the information recording medium, a first laser-beam receiving and emitting device holding means rotated so as to approximately linearly move with a position different from an optical axis of the laser beam as a fulcrum to thereby position and hold the laser-beam receiving and emitting device, and a second laser-beam receiving and emitting device holding means rotated with the optical axis thereof as a fulcrum to thereby position and hold the laser-beam receiving and emitting device.

According to the present invention, preferably, the fulcrum of the first laser-beam receiving and emitting device holding means comprises a circular hole and a support portion fit in the circular hole and having a circular section, and a rotational side thereof rotated about the fulcrum comprises an elongated hole and a support portion fit in the elongated hole and movable within the elongated hole.

According to the present invention, preferably, the fulcrum of the second laser-beam receiving and emitting device holding means is located in a position corresponding to the optical axis and a rotational side thereof comprises an elongated hole and a support portion fit in the elongated hole and movable within the elongated hole.

According to the present invention, preferably a biaxial actuator for displacing the objective lens in focus and tracking directions of the information recording medium is provided on the one surface side of the slide member, and the first laser-beam receiving and emitting device holding means or the second laser-beam receiving and emitting device holding means is provided on the other surface side of the slide member.

According to the above construction, when it is desired to obtain a tracking error signal by a so-called push-pull system, for example, the first laser-beam receiving and emitting device holding means is set to a predetermined base member and is rotated so as to approximately linearly move with a position different from an optical axis of a laser beam as a fulcrum to thereby position and hold the laser-beam receiving and emitting device. Thus, the laser-beam receiving and emitting device held by the first laser-beam receiving and emitting device holding means can be substantially linearly-displaced in accordance with the push-pull system to determine its position.

On the other hand, when it is desired to obtain a tracking error signal by a so-called three-spot system, for example, the second laser-beam receiving and emitting device holding means is set to a predetermined base member and is rotated with the optical axis of the laser beam as a fulcrum so as to position and hold the laser-beam receiving and emitting device. Thus, the laser-beam receiving and emitting device held by the second laser-beam receiving and emitting device holding means can be rotated and moved in accordance with the three-spot system to determine its position.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Preferred embodiments of the present invention will hereinafter be described in detail with reference to the accompanying drawings.

Incidentally, technically preferred various limitations are imposed on embodiments to be described later since they are preferred and specific embodiments of the invention. However, the invention in its aspect is not limited to the specific embodiments unless otherwise specifically indicated in the following description.

Figure 1:
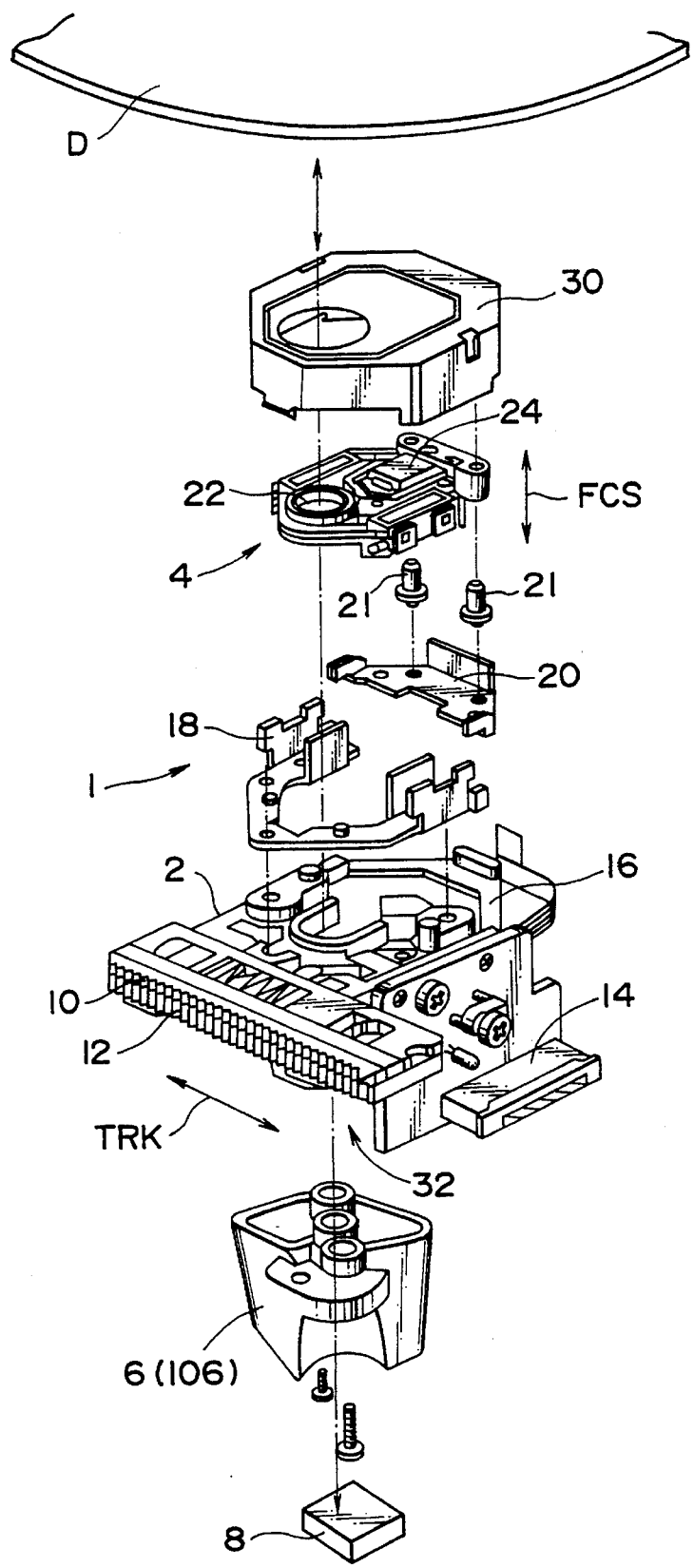
FIG. 1 is an exploded perspective view showing an optical pickup according to the present invention and a part of an optical disc.

FIG. 1 is an exploded perspective view showing a preferred embodiment of an optical pickup according to the present invention. An optical disc D is disposed in a face-to-face relationship to the optical pickup 1. In FIG. 1, the optical pickup 1 is applied to an optical disc device for reproducing a compact disc (CD), for example.

In FIG. 1, the optical pickup 1 generally comprises a slide base 2, a biaxial actuator 4, a base which serves as a laser-beam receiving and emitting device holding means 6 (or 106) and an IC 8 having a laser coupler serving as a laser-beam receiving and emitting device, and the like.

The slide base 2 is composed of a resin such as a polycarbonate and has racks 10 and 12. The racks 10 and 12 are brought into engagement with a gear of an unillustrated motor and allow the slide base 2 to move in a tracking TRK direction (i.e., in a radial direction of the optical disc D) through a guide member such as a guide shaft under the driving action of the motor.

The slide base 2 shown in FIG. 1 is also called an optical slide base and has a printed wiring flexible substrate, a flexible connector 14, etc.

One surface 16 of the slide base 2 includes a yoke 18 and an adjustment plate 20 mounted thereon. The biaxial actuator 4 is mounted on the yoke 18 and the adjustment plate 20 by a pin 21.

The biaxial actuator 4 is also called a moving part assembly and comprises an objective lens 22 and an actuator portion 24. The biaxial actuator 4 is of, for example, a hinge-type or a parallel spring-operated biaxial actuator which is in common use.

The biaxial actuator 4 enables the objective lens 22 to be displaced in a focus FCS direction (i.e., in the direction of approaching the optical disc D and being spaced away from the optical disc D) and in the tracking TRK direction.

A biaxial cover 30 is mounted on the slide base 2. The biaxial cover 30 covers the biaxial actuator 4 so as to prevent dust or the like from entering therein.

The other surface 32 of the slide base 2 includes a base 6 mounted thereon. The IC 8 having the laser coupler used as the laser-beam receiving and emitting device as described above is secured to the base 6 by screws.

Figure 2:
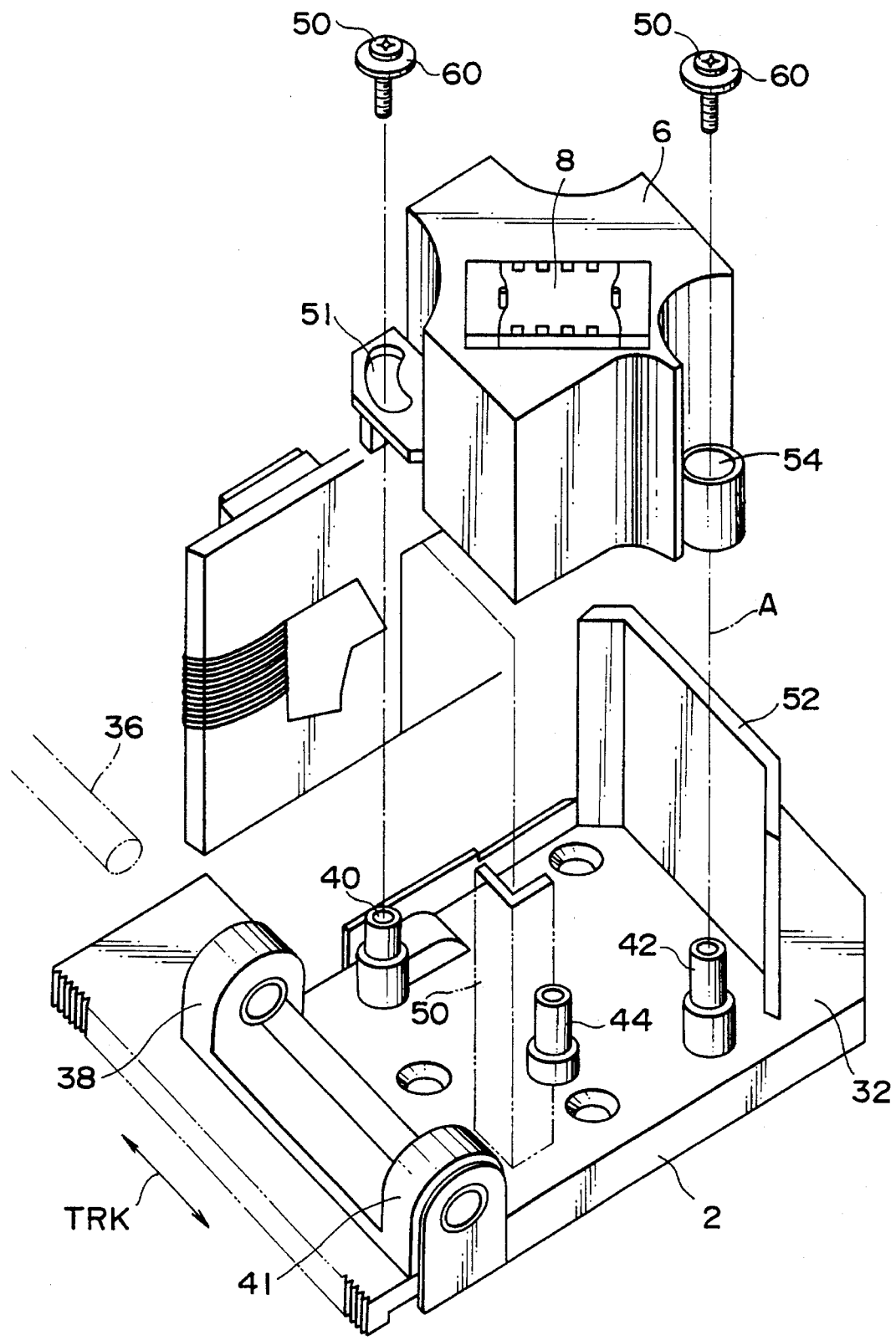
FIG. 2 is an exploded perspective view illustrating a slide base of the optical pickup shown in FIG. 1 and a member for holding an IC having a laser-beam receiving and emitting device incorporated therein.

FIG. 2 is an exploded perspective view showing the slide base 2 and the base 6 used as a first laser-beam receiving and emitting device holding means, both of which are shown in FIG. 1. The IC 8 is fixed to the base 6 by an adhesive.

Incidentally, the one surface 16 of the slide base 2 is shown so as to extend toward the upper side as seen in FIG. 1, whereas the other surface 32 thereof is shown so as to extend in an upward direction as seen in FIG. 2.

The slide base 2 can move along the tracking TRK direction by a guide shaft 36 through bearings 38 and 41.

Figure 4:
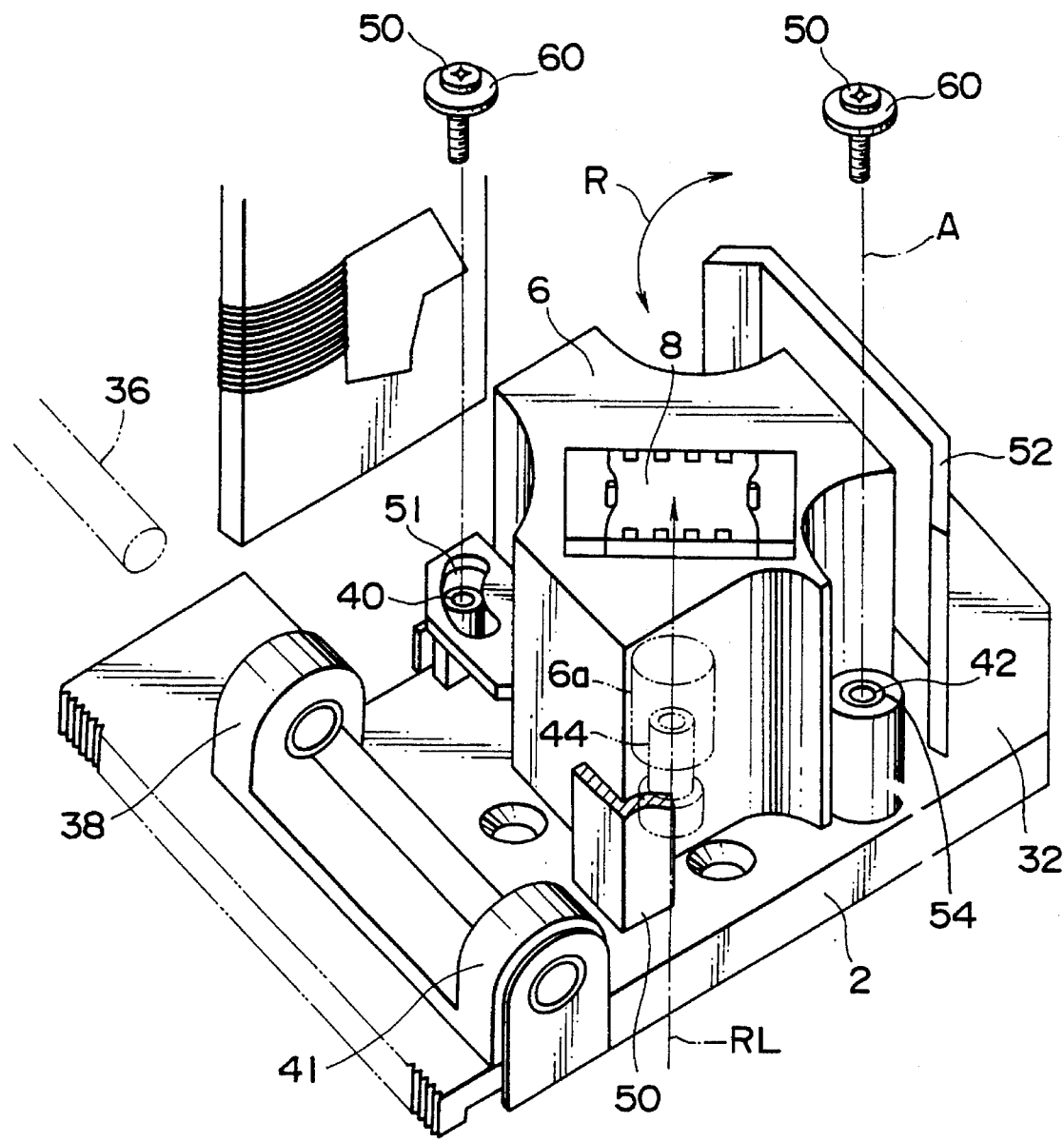
FIG. 4 is a perspective view showing a state in which the slide base shown in FIG. 2 is formed integrally with the holding member shown in FIG. 2.

The other surface 32 of the slide base 2 has a first boss 40, a second boss 42 and a third boss 44 mounted thereon. The other surface 32 further includes guide members 50 and 52 which project therefrom. A laser beam emitted from a laser-beam emitting unit or device of the IC 8 passes through the third boss 44 shown in FIG. 2 and is applied to an information recording surface of the optical disc D through the objective lens 22 so as to be focused thereon. A laser beam reflected from the information recording surface of the optical disc D is transmitted through the third boss 44 shown in FIG. 4 (along an optically axial RL direction as seen in FIG. 4) through the objective lens 22 so as to be received by a laser-beam receiving unit or device of the IC 8 shown in FIG. 2.

The first and second bosses 40 and 42 are cylindrical projections and are used to fix the IC base 6 to the other surface 32 by screws 50. The first boss 40 is fit in a hole 51 for mounting the IC base 6 and the second boss 42 is fit in a hole 54 for mounting the IC base 6. The third boss 44 is fit on a projection 6a of the IC base 6.

The hole 51 is of an elongated hole and the hole 54 is of a circular hole. The hole 54 is of a hole formed in a size corresponding to the second boss 42 used as a support portion. Thus, rotating portions (on the elongated hole 51 side) of the IC 8 and the IC base 6 are rotatable about the second boss 42. Therefore, the IC base 6 is rotatably displaced along a direction indicated by arrow R as shown in FIG. 4. As a result, the first boss 40 is displaced within the elongated hole 51 so that the IC base 6 itself can be rotatably moved.

After the IC base 6 has been positioned, the IC base 6 can be fixed to the slide base 2 by respectively tightening the screws 50 to the first boss 40 and the second boss 42 through disc springs 60.

Figure 3:
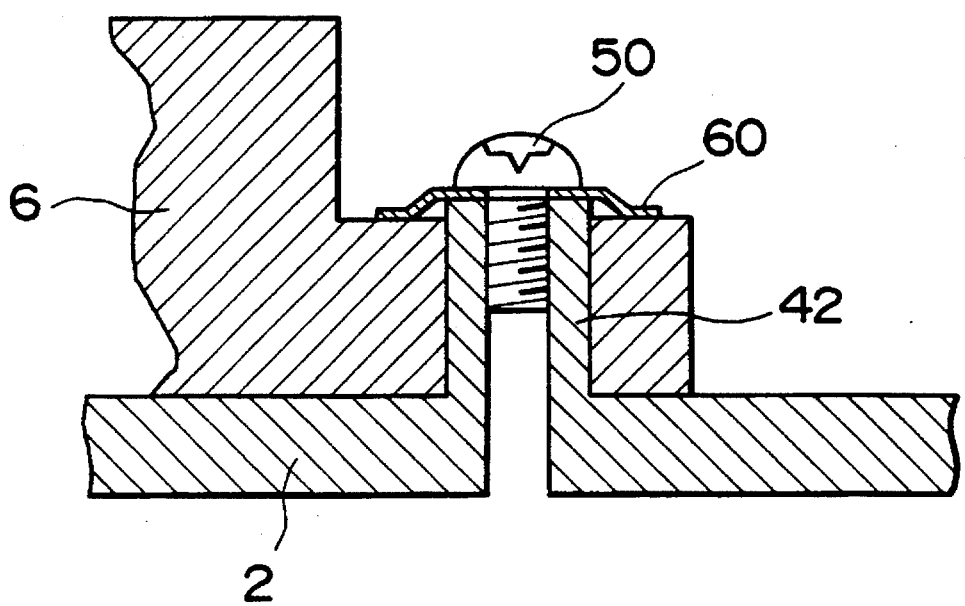
FIG. 3 is a cross-sectional view showing the slide base and the holding member shown in FIG. 2, which have been fixed to each other.

FIG. 3 illustrates one example in which the IC base 6 is mounted on the second boss 42 by the screw 50.

The screw 50 is fixed to the second boss 42 through the specific disc spring 60. Thus, the IC base 6 can be securely fixed to the slide base 2. The screws 50 with the disc springs 60 normally fix the IC base 6 to the slide base 2. However, if the screws 50 are twisted by an adjustment screwdriver, then the IC base 6 and the slide base 2 can be fastened to each other with a variable level of strength.

As shown in FIG. 4, the IC base 6 can be positioned by being rotatably displaced in the direction indicated by arrow R with the second boss 42 as the center of rotation or a fulcrum A. The present embodiment is effective on a case where a method of obtaining a tracking error signal based on a push-pull system shown in FIG. 6 is adopted.

Namely, in a process for adjusting the rotation of the IC base 6 relative to the slide base 2, the IC 8 is positionally displaced about 0.2 mm, for example. Further, since a distance between the fulcrum or the center of rotation A of the second boss 42 and the IC 8 is 9.5 mm, for example, the travel distance 0.2 mm relative to the position of the IC 8 is sufficiently smaller than the distance 9.5 mm ranging from the fulcrum A to the IC 8. Accordingly, this rotational movement may be approximately regarded as the parallel or linear movement of the IC 8 and the IC base 6.

Figure 6:
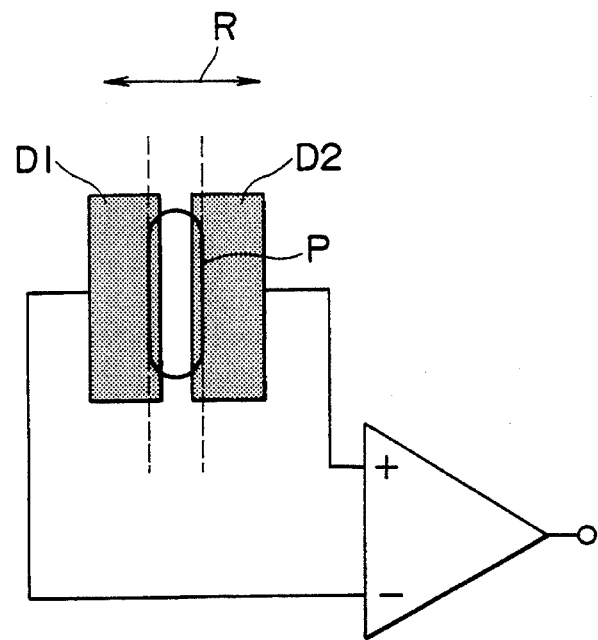
FIG. 6 is a view for describing an adjustment made to tracking of a push-pull system by using the embodiment shown in FIGS. 2 and 4.

When one attempts to detect a tracking error signal by photodiodes D1 and D2 serving as laser-beam receiving devices or elements of the IC 8 under the use of the push-pull system, it is necessary to make positioning adjustments to the photodiodes D1 and D2 divided into two so as to correspond to a pit P of the optical disc D as shown in FIG. 6, for example. In this case, the method of moving the IC 8 and the IC base 6 in parallel or moving the same approximately linearly (i.e., in the arrow R direction) as described above is effective only in making the positioning adjustments to the photodiodes D1 and D2 referred to above. Thus, a laser beam emitted from the laser-beam emitting device of the IC 8 is applied to the optical disc D through the objective lens 22 and a laser beam reflected from the optical disc D is set so as to be applied to proper positions of the photodiodes D1 and D2.

Figure 5:
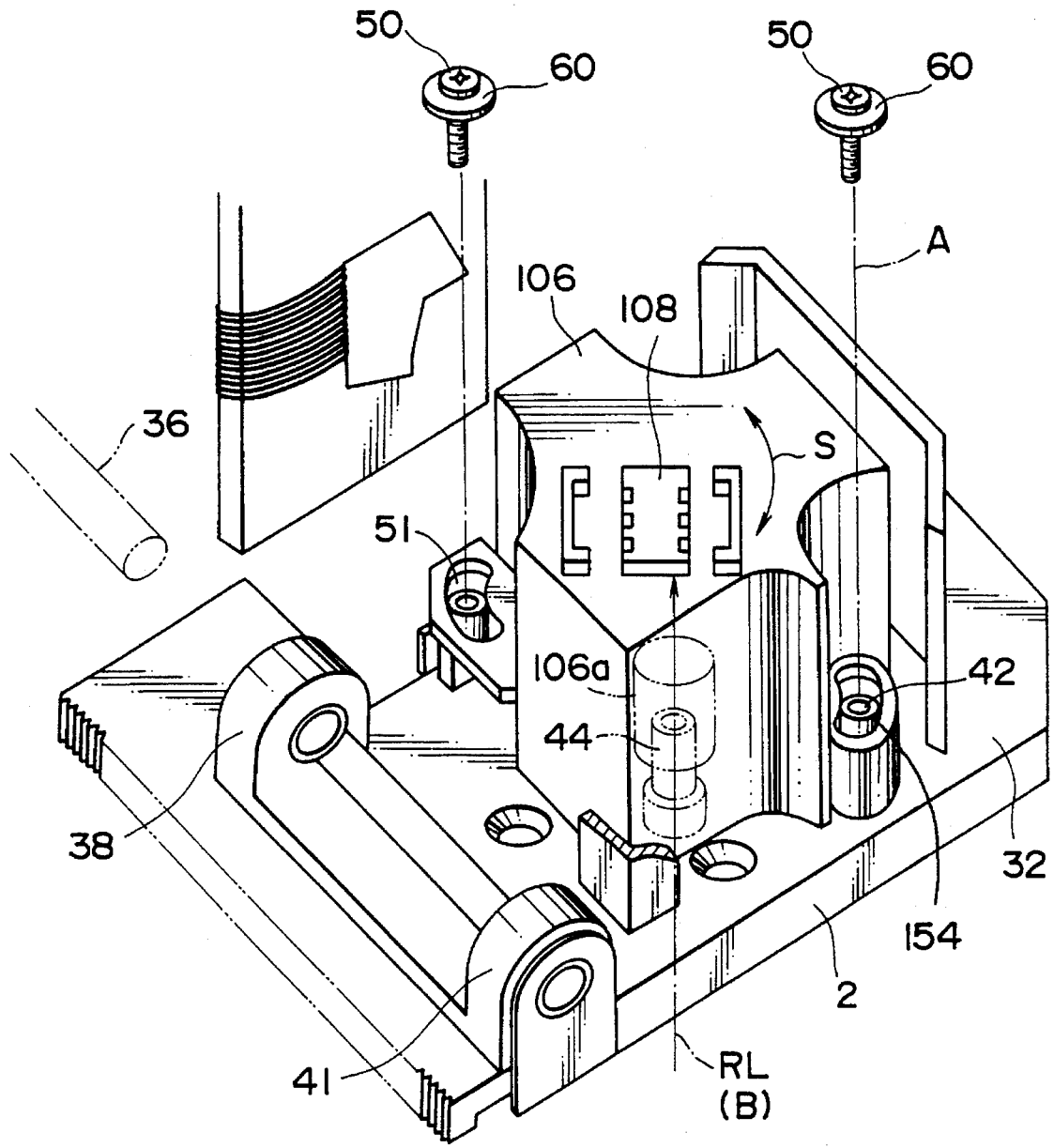
FIG. 5 is a perspective view showing a slide base and a holding member employed in another embodiment of the present invention.

Reference will now be made to FIG. 5.

FIG. 5 shows the slide base 2 shown in FIG. 1 and an IC base 106 which serves as a second laser-beam receiving and emitting device holding means.

The IC base 106 has an elongated hole 51 and an elongated hole 154 defined therein. The elongated hole 51 corresponds to the first boss 40, whereas the elongated hole 154 corresponds to the second boss 42. The third boss 44 is fit on a projection 106a of the IC base 106.

An IC 108 is fixed onto the IC base 106 by an adhesive.

In the embodiment shown in FIG. 5, the IC base 106 can be rotated in a direction indicated by arrow S about the third boss 44 of the IC base 106. Namely, the IC 108 and the IC base 106 can be positioned by being rotated in the arrow S direction about the third boss 44 (optical axis RL and center B) in ranges of the elongated holes 51 and 154 on the rotational sides thereof. Further, the IC base 106 can be fixed to the first boss 40 and the second boss 42 by screws 50 and disc springs 60.

Figure 7:
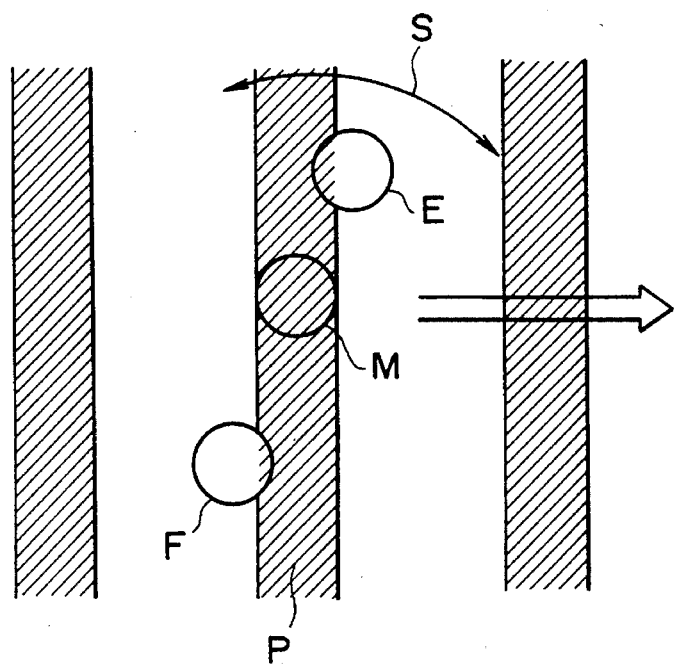
FIG. 7 is a view for describing an adjustment made to tracking by a three-spot system under rotational movements of the embodiment shown in FIG. 5.

The system of such a type that the IC base 106 is positioned under its rotational movement in this way, can be applied to a so-called tracking error detection of three-spot system shown in FIG. 7. In the three-spot system (twin-beam system), a main beam M and side beams F and E can be properly positioned to a pit P as shown in FIG. 7 by rotating the main beam M and the side beams F and E in a direction indicated by arrow S about the pit P.

The slide base can be composed of a resin, for example, a polycarbonate. Further, each of the bases 6 and 106 can be made from a zinc diecast, for example. The ICs 8 and 108 may be respectively fixed to the bases 6 and 106 by, for example, a fixing method other than an adhesive.

One example of a laser coupler will now be described.

Figure 10:
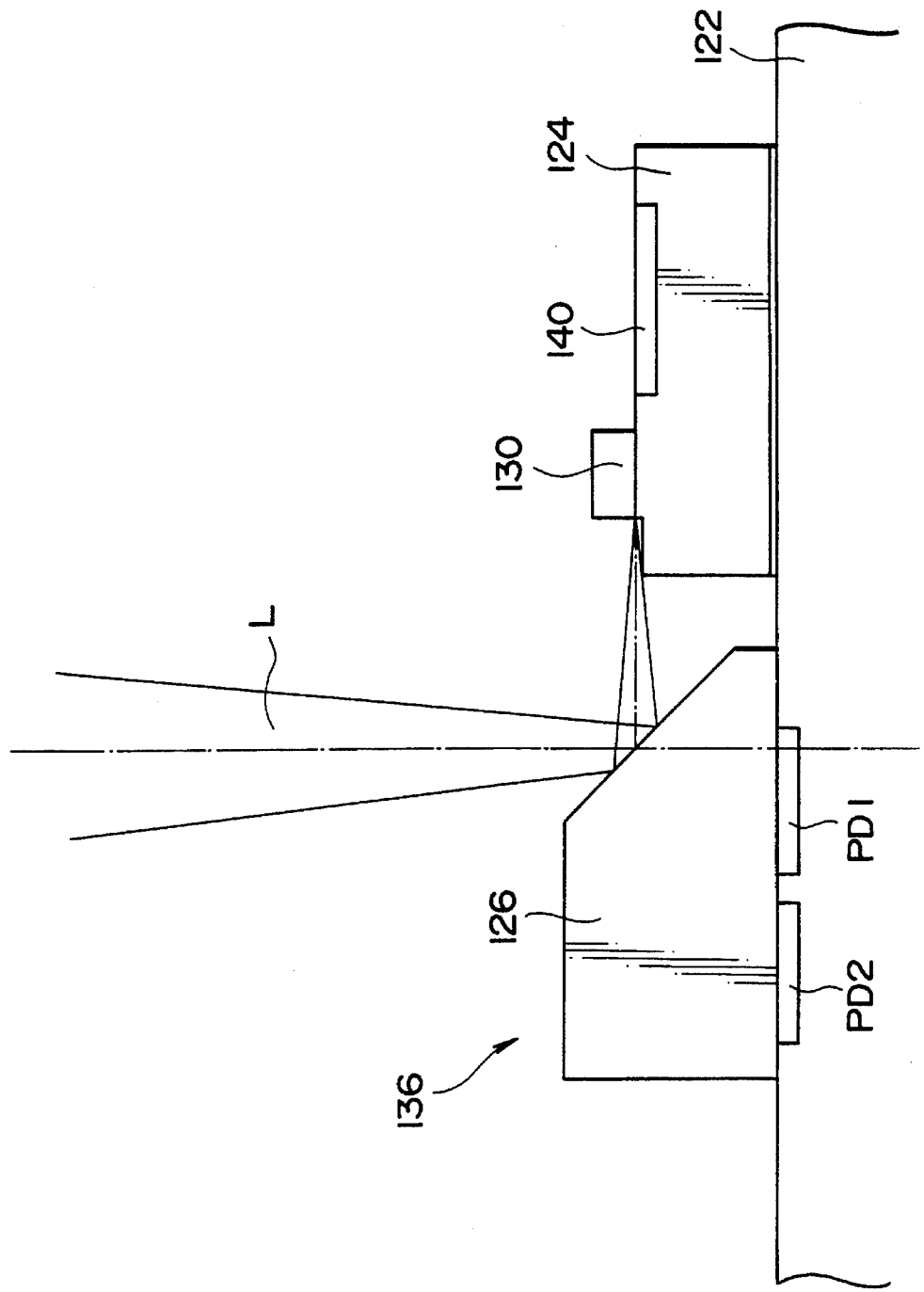
FIG. 10 is a view depicting one example of a laser coupler.

A semiconductor device 124 and a microprism 126 are disposed on a substrate 122 of a laser coupler 136 shown in FIG. 10.

A group of photodetector PD1 and PD2 used as a laser-beam receiving element or device, is provided within the substrate 122. The photodetectors PD1 and PD2 have predetermined patterns respectively and can obtain a focus error signal, a tracking error signal and a regenerative signal from a reflected laser beam of a laser beam L emitted from an optical disc such as a compact disc.

A laser diode chip 130, which serves as a laser-beam emitting element or device, is disposed on the semiconductor device 124. A photodiode 140 for monitoring a laser beam is provided behind the laser diode chip 130.

Thus, if one type of slide base (base member) shown in FIG. 2 and two types of IC bases 6 and 106 are provided, then the embodiment according to the present invention can be applied to a three-spot system as well as to a push-pull system. On the other hand, two types of slide bases (base members) and two types of IC bases had to be prepared in the prior art.

Thus, the cost of a die for each slide base can be reduced. Even when an adjusting jig is used, the slide base may be of one type.

Since the slide base may be of one type, parts inventories at the time of production can also be reduced.

The present invention is not necessarily limited to the aforementioned embodiment.

Figure 8:
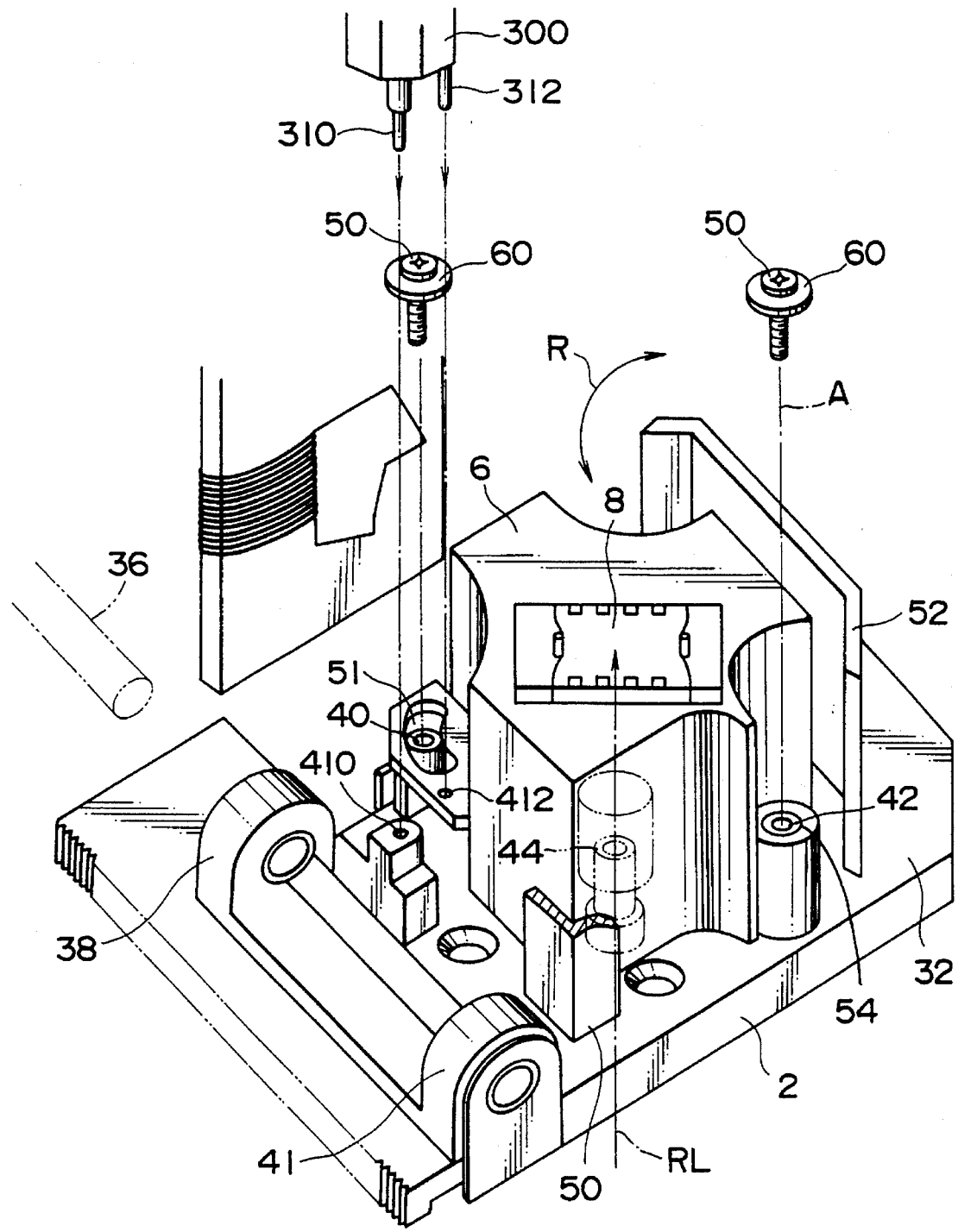
FIG. 8 is a view showing a further embodiment of the present invention.

For example, an embodiment shown in FIG. 8 corresponds to the embodiment shown in FIG. 4. In addition to this, however, an IC base 6 is approximately linearly moved by an adjusting jig 300 to adjust the position thereof relative to a slide base 2.

Namely, tools 310 and 312 of the adjusting jig 300 are respectively inserted into a hole 410 defined in the slide base 2 and a hole 412 defined in the IC base 6. Next, an operator displaces the adjusting jig 300 to slightly rotate the IC base 6 in a direction indicated by arrow R so that the IC base 6 is approximately linearly moved, whereby the position of the IC base 6 can be adjusted.

Figure 9:
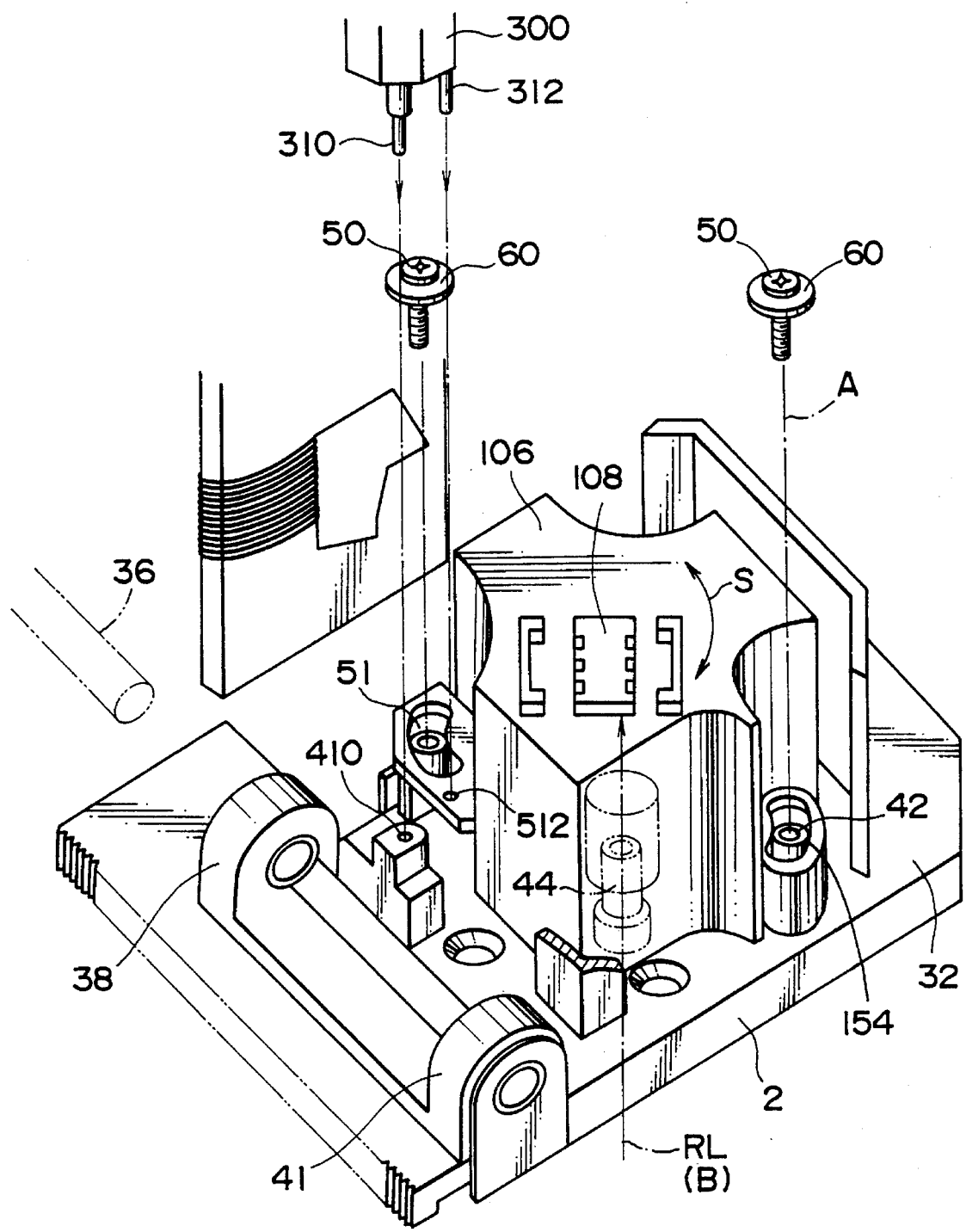
FIG. 9 is a view illustrating a still further embodiment of the present invention.

Further, an embodiment shown in FIG. 9 corresponds to the embodiment illustrated in FIG. 5. In addition to this, however, an IC base 106 is rotated and moved by an adjusting jig 300 to adjust the position thereof relative to a slide base 2.

Namely, tools 310 and 312 of the adjusting jig 300 are respectively inserted into a hole 410 of the slide base 2 and a hole 512 of the IC base 106. Next, an operator displaces the adjusting jig 300 to rotate the IC base 106 in a direction indicated by arrow S so that the IC base 106 is rotatably moved, whereby the position of the IC base 106 can be adjusted.

The aforementioned embodiments have been described by using the compact disc as the optical disc D, for example. However, the optical pickup according to the present invention is not necessarily limited to the embodiments applied in the above-described manner. The optical pickup can be applied to other kinds of optical discs such as a CD-ROM, etc. For example, the optical pickup according to the present invention can be applied to a recording and playback device, i.e., a direct-read-after-write device for a magneto-optical disc such as an MO, an MD or the like.

According to the present invention, as has been described above, the two types of slide bases are not necessary and the position of the slide base can be easily adjusted.

Having now fully described the invention, it will be apparent to those skilled in the art that many changes and modifications can be made without departing from the spirit or scope of the invention as set forth herein.

What is claimed is:

1. An optical pickup for reproducing information recorded on an information recording medium with a laser beam, comprising:

a slide member having a plurality of cylindrical bosses and being displaced between an inner peripheral portion of the information recording medium and an outer peripheral portion thereof, a first one of said plurality of cylindrical bosses being hollow so as to form a tube;

a laser-beam receiving and emitting device comprising an emitting unit for irradiating the information recording medium with the laser beam and a receiving unit for receiving therein the laser beam reflected from the information recording medium; and means for holding said laser-beam receiving and emitting device, said laser-beam receiving and emitting device holding means having a plurality of engagement portions formed therein respectively brought into engagement with said plurality of bosses, said first one of said plurality of bosses being arranged in a first one of said plurality of engagement portions relative to said laser-beam device so that the laser beam is emitted and received through the hollow boss, a second one of said plurality of engagement portions being formed as a slot receiving therein a second one of said plurality of bosses, so that said holding means is rotated with a third one of said plurality of bosses as a fulcrum.

2. An optical pickup for reproducing information recorded on an information recording medium with a laser beam, comprising:

a slide member having a plurality of upraised cylindrical bosses and being displaced between an inner peripheral portion of the information recording medium and an outer peripheral portion thereof, a first one of said plurality of bosses being a hollow tube;

a laser-beam receiving and emitting device comprising an emitting unit for irradiating the information recording medium with the laser beam and a receiving unit for receiving therein the laser beam reflected from the information recording medium; and means for holding said laser-beam receiving and emitting device having a first engagement portion engaged with said first one of said plurality of bosses, said first one of said plurality of bosses and said first one of said plurality of engagement portions being arranged relative to said laser-beam device so that the laser beam is emitted and received through the hollow boss, a second engagement portion engaged with a second one of said plurality of bosses, and a third engagement portion engaged with a third one of said plurality of bosses, said second engagement portion and said third engagement portion being located in positions substantially opposed to each other on opposite sides of said means for holding said laser-beam receiving and emitting device, said laser-beam receiving and emitting device holding means being rotated with said second boss as a fulcrum.

3. The optical pickup according to claim 2, wherein said second engagement portion comprises a substantially circular hole and said second boss comprises a cylindrical projection inserted in the circular hole.

4. The optical pickup according to claim 3, wherein said third engagement portion comprises an elongated hole, said third one of said plurality of bosses comprises a cylindrical projection inserted in the elongated hole, and said third engagement portion is held in engagement with said third boss so as to be movable within the elongated hole.

5. The optical pickup according to claim 4, wherein after said slide member has positioned said laser-beam receiving and emitting device holding means at a selected position, said second engagement portion and said second one of said plurality of bosses and said third engagement portion and said third one of said plurality of bosses are respectively fixed to one another.

6. The optical pickup according to claim 2, further comprising push-pull system means for detecting a tracking error from the laser beam reflected from the information recording medium.

7. An optical pickup for reproducing information recorded on an information recording medium with a laser beam, comprising:

a slide member having a first, second, and third bosses and being displaced between an inner peripheral portion of the information recording medium and an outer peripheral portion thereof;

a laser-beam receiving and emitting device comprising an emitting unit for irradiating the information recording medium with the laser beam and a receiving unit for receiving therein the laser beam reflected from the information recording medium; and means for holding said laser-beam receiving and emitting device having a first engagement portion engaged with said first boss, wherein said first boss is a hollow tube and said first boss and said first engagement portion are arranged relative to said laser-beam device so that the laser beam is emitted and received through said first boss, a second engagement portion engaged with said second boss and a third engagement portion engaged with said third boss, said first engagement portion and said first boss being substantially aligned with an optical axis of the laser beam, said laser-beam receiving and emitting device holding means being rotated about the optical axis thereof with said first boss as a fulcrum.

8. The optical pickup according to claim 7, wherein said second engagement portion comprises an elongated hole and said second boss comprises a cylindrical projection inserted in the elongated hole, and said second engagement portion is held in engagement with said second boss, so that said second boss is movable within the elongated hole.

9. The optical pickup according to claim 8, wherein said third engagement portion comprises an elongated hole and said third boss comprises a cylindrical projection inserted in the elongated hole, and wherein said third engagement portion is held in engagement with said third boss, so that said third boss is moveable within the elongated hole.

10. The optical pickup according to claim 9, wherein after said slide member has positioned said laser-beam receiving and emitting device holding means at a selected position, said second engagement portion and said second boss and said third engagement portion and said third boss are respectively fixed to one another.

11. The optical pickup according to claim 7, further comprising three-spot system means for detecting a tracking error from the laser beam reflected from the information recording medium.

* * * * *